(12) United States Patent
Kupferman

(10) Patent No.: US 7,046,465 B1
(45) Date of Patent: May 16, 2006

(54) DISK DRIVE HAVING ONE OR MORE PARTIAL SERVO WEDGES THAT INCLUDES A SHORT SERVO SYNC MARK THAT IS DIFFERENT THAN THE SERVO SYNC WORD OF FULL SERVO WEDGES

(75) Inventor: Hanan Kupferman, Diamond Bar, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 120 days.

(21) Appl. No.: 10/927,900

(22) Filed: Aug. 27, 2004

(51) Int. Cl.
*G11B 5/09* (2006.01)
*G11B 5/596* (2006.01)

(52) U.S. Cl. ...................... 360/48; 360/77.08
(58) Field of Classification Search ...... None
See application file for complete search history.

(56) References Cited

U.S. PATENT DOCUMENTS

| | | | |
|---|---|---|---|
| 5,784,219 A | | 7/1998 | Genheimer |
| 6,091,564 A | * | 7/2000 | Codilian et al. ............ 360/75 |
| 6,388,829 B1 | * | 5/2002 | Nazarian ................. 360/48 |
| 2003/0002189 A1 | | 1/2003 | Ozdemir |
| 2003/0043710 A1 | | 3/2003 | Shelton et al. |

* cited by examiner

*Primary Examiner*—Wayne Young
*Assistant Examiner*—Daniell L. Negrón
(74) *Attorney, Agent, or Firm*—Alan W. Young, Esq.

(57) ABSTRACT

A disk drive has a spindle motor, a disk mounted for rotation on the spindle motor, and a head for reading from and writing to the disk. The disk includes a recording surface having a track that includes a first full servo wedge and a second full servo wedge, each of the first full and second full servo wedges defining a leading end and a trailing end and having, between leading and trailing ends, a preamble, a servo sync word, a track ID, and a plurality of servo positioning burst fields. The recording surface further includes user addressable data locations and a first partial servo wedge disposed between the trailing end of the first full servo wedge and the leading end of the second full servo wedge. The first partial servo wedge is devoid of preamble, track ID and wedge ID and includes a short servo sync mark that is different from the servo sync word. The servo sync mark defines a predetermined bit pattern that is immediately followed by a plurality of servo bursts.

17 Claims, 6 Drawing Sheets

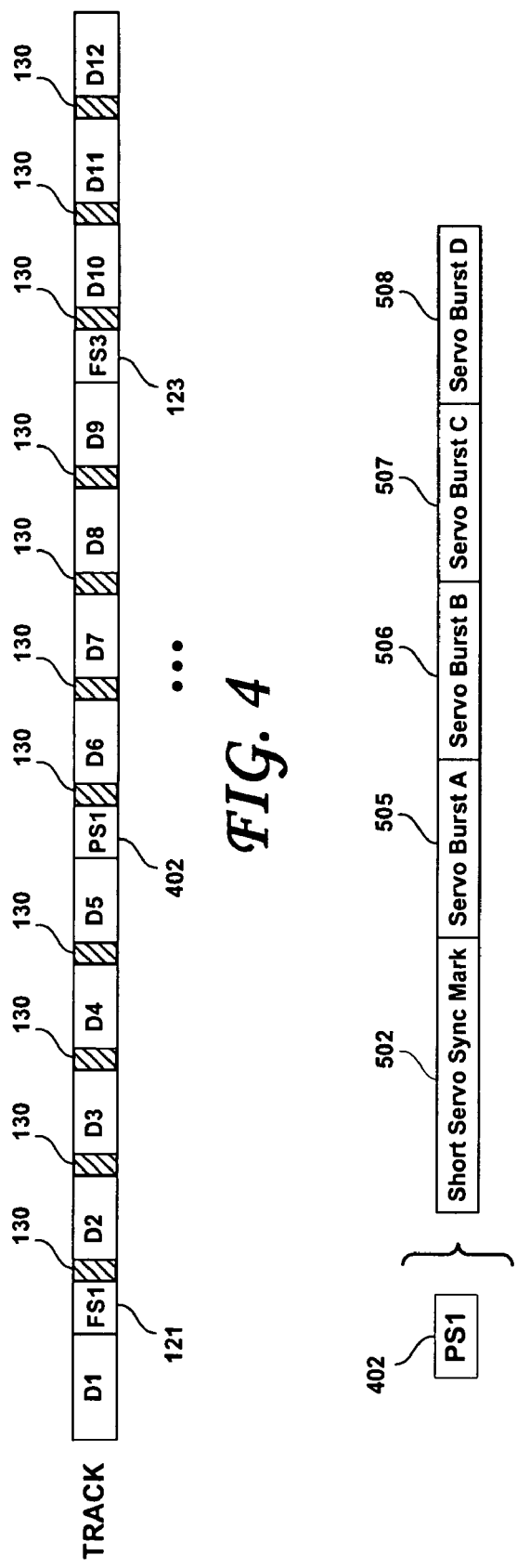
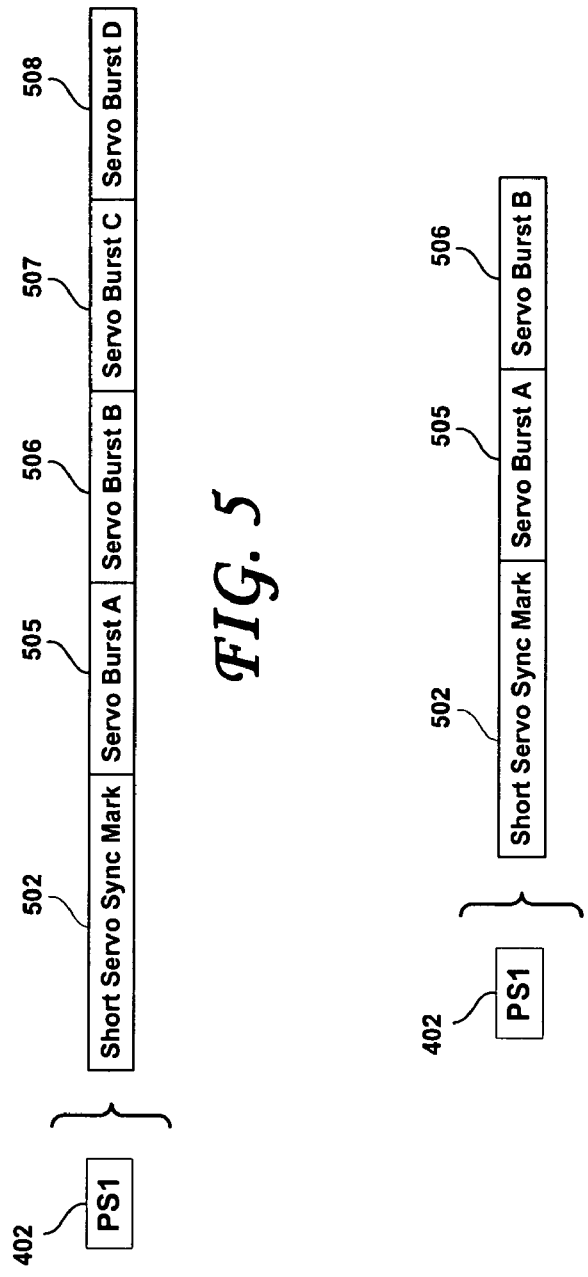

DISK DRIVE HAVING ONE OR MORE PARTIAL SERVO WEDGES THAT INCLUDES A SHORT SERVO SYNC MARK THAT IS DIFFERENT THAN THE SERVO SYNC WORD OF FULL SERVO WEDGES

BACKGROUND OF THE INVENTION

1. Field of the Invention

The present invention relates to disk drives. More particularly, the present invention relates to disk drives having a magnetic disk that has one or more partial servo wedges between full servo wedges.

2. Description of the Prior Art

In contemporary magnetic hard disk drives, servo sectors of servo information are interspersed with data sectors circumferentially in concentric tracks around the recording surface or surfaces of the disk or disks. As shown in FIG. 1, the format of a track of a rigid magnetic disk drive calls for regularly spaced embedded servo sectors (also called servo wedges) (of which representative servo sectors 121, 122, 123 are shown) containing servo information therein. Between the embedded servo sectors are a number of data sectors, of which D1–D12 are shown. There may be an integer number of data sectors between any two servo sectors. However, a track may also include a non-integer number of data sectors between adjacent servo sectors, as some of the data sectors may be split across servo sectors.

As shown in FIG. 2, a servo sector (exemplary servo sector S2 122 being shown for illustrative purposes only, it being understood that all of the servo sectors shown in FIG. 1 have the same format) may include a preamble 201, 202, a servo sync word 203, a track identifier 204 and servo burst fields A, B, C and D, referenced by numerals 205, 206, 207 and 208, respectively. The preamble 201, 202 may, for example, include a first portion 201 that includes a fill code to enable the read channel to adjust is gain and allows a phase locked loop (PLL) to achieve bit synchronization with the incoming servo information. The preamble may also include a second portion 202 that includes a DC erase portion in which there are no logical transitions (such as an uninterrupted string of zeros, for example) for a specified length. As areas containing no transitions are illegal everywhere else on the disk, the DC erase field uniquely identifies this portion as being part of a servo sector. Following the preamble 201, 202 is a servo sync word 203 that identifies the sector as being a servo wedge and that establishes byte synchronization. After the servo sync word 203 is a track identifier (ID), which uniquely identifies the number of the track being read. The servo burst fields 205, 206, 207 and 208 are used to determine the head's current location on the track. The detection of the servo sync word establishes a positive timing reference and allows a disk controller integrated circuit to forecast the timing of the next servo sync word, since they are equally spaced along the tracks recorded on the recording surface of the disk or disks and since the nominal angular velocity of the disk is known.

A spindle motor drives the disk or disks in rotation. However, the spindle motor does not, in practice, drive the disks at a perfectly constant angular velocity. Indeed, there are some variations in the angular velocity at which the spindle motor drives the disk in rotation. Such variations may cause the detection of the servo sync words to be read later (in the case wherein the spindle motor has slowed down relative to its nominal speed) or earlier (in the case wherein the spindle motor is driving the disk faster than its nominal angular velocity) than forecast.

The disk controller, to detect the servo sync word, opens up a timing window during a servo gate signal (not shown), which enables the read channel to begin the detection of the preamble of the servo sector, in order to establish gain, achieve bit synchronization and the like. The controller also opens another timing window for the detection of the servo sync word. This timing window is made as narrow as possible within the constraints of the variations in the angular velocity of the spindle motor, to reduce the possibility of a false detection of the servo sync word. If the servo sync word is made unique and the timing window for its detection is made narrow (i.e., is opened only for a short duration), the probability of a false detection is relatively low.

During most of the operation of the drive, the controller operates in hard sector mode. In hard sector mode, upon detection of a servo sync word, a fixed interval is established for the detection of the next servo sync word in the next servo sector. After the fixed interval has elapsed, the controller opens up the window to detect the next servo sync word. The fixed interval may be established by a counter that is decremented until it reaches zero, for example. If the drive has, for any reason, lost synchronization or is just starting up and has not yet achieved synchronization, the drive may operate in a soft sector mode. In soft sector mode, the controller may not know the location of the read/write heads over the disk. In soft sector mode, the servo gate signal is opened up and the drive looks for the next preamble, track ID and servo sync word. Once several servo sync words have been detected and synchronization is achieved, the drive may switch to hard sector mode. The detection of the servo sector and of the servo sync word within the servo sector, therefore, is essential as it allows the controller to predictably determine the start of the data sectors on the track.

FIG. 3 is a diagram of an exemplary structure of a data sector recorded on the recording surface of a disk of a magnetic hard disk drive. Exemplary data sector 104 (data sector D4 104 being shown for illustrative purposes only, it being understood that all of the data sectors shown in FIG. 1 may have the same format) includes a preamble 301, 302, followed by data sync word 303 and the data 304. The read channel decodes each data sector and the data sync word establishes when the data 304 may be clocked in (writing) or out (reading). The aforementioned speed variations in the angular velocity of the spindle motor require that guard bands 130 (FIG. 1) be included before each data sector. The width of the guard bands is a function of the above-described variation in spindle motor speed between writing data to that sector and subsequently reading the data back. Indeed, the width of the guard band 130 is related to the minimum to maximum spindle motor speed variation, as well as the time interval between re-synchronizing the sector timing logic upon detection of the servo sync word. As the read/write head moves away from the detected servo sync word, the uncertainty (it is a sampled system) of the location of a sector is the difference between the actual angular velocity of the spindle motor and the nominal speed thereof, and increases in linear fashion. This results in maximum uncertainty just before the detection of the next servo sync word. The wider the guard bands are, the more disk surface area is made unavailable for storing data. Indeed, the servo sectors and the guard bands represent overhead on the recording surface of the disk, meaning that they take up space on the disk that is unavailable to user data. Therefore, if the width of the servo sectors and the width of the guard bands could be reduced, comparatively more data could be stored on the disks.

SUMMARY OF THE INVENTION

According to an embodiment thereof, the present invention is a disk drive that includes a spindle motor; a disk mounted for rotation on the spindle motor, and a head for reading from and writing to the disk. The disk includes a recording surface having a track that includes a first full servo wedge and a second full servo wedge, each of the first full and second full servo wedges defining a leading end and a trailing end and having, between leading and trailing ends, a preamble, a servo sync word, a track ID, and a plurality of servo positioning burst fields. The recording surface further includes user addressable data locations and a first partial servo wedge disposed between the trailing end of the first full servo wedge and the leading end of the second full servo wedge. The first partial servo wedge is devoid of preamble, track ID and wedge ID and includes a short servo sync mark that is different from the servo sync word, the servo sync mark defining a predetermined bit pattern that is immediately followed by a plurality of servo bursts.

The disk may further include one or more second partial servo wedges between the first partial servo wedge and the second full servo wedge. The servo sync mark may be shorter in length than the servo sync word. The servo sync mark may include a predetermined bit pattern. The predetermined bit pattern may be 8 bits in length. The predetermined bit pattern may include a portion in which no logical transitions occur.

According to another embodiment thereof, the present invention is also a disk for a magnetic disk drive, the disk including a recording surface having a track that includes a first full servo wedge and a second full servo wedge, each of the first full and second full servo wedges defining a leading end and a trailing end and having, between leading and trailing ends, a preamble, a servo sync word, a track ID, and a plurality of servo positioning burst fields, the recording surface further including user addressable data locations and a first partial servo wedge disposed between the trailing end of the first full servo wedge and the leading end of the second full servo wedge, the first partial servo wedge being devoid of preamble, track ID and wedge ID and including a short servo sync mark that is different from the servo sync word, the servo sync mark defining a predetermined bit pattern that is immediately followed by a plurality of servo bursts.

The disk may further include one or more second partial servo wedges between the first partial servo wedge and the second full servo wedge. The servo sync mark may be shorter in length than the servo sync word. The servo sync mark may include a predetermined bit pattern, which may be, for example, 8 bits in length. The predetermined bit pattern may include a portion in which no logical transitions occur.

The present invention may also be defined in terms of a method of reading a magnetic disk of a disk drive. According to this embodiment, the method may include the sequential steps of reading a first full servo wedge disposed along a first track, the first full servo wedge defining a leading end and a trailing end and having, between leading and trailing ends, a preamble, a servo sync word, a track ID, and a plurality of servo positioning burst fields; reading first user data from first user addressable data locations disposed along the track after the first full servo wedge; reading a first partial servo wedge disposed along the first track after the first user addressable locations, the first partial servo wedge being devoid of preamble, track ID and wedge ID and including a short servo sync mark that is different from the servo sync word, the servo sync mark defining a predetermined bit pattern that is immediately followed by a plurality of servo bursts; reading second user data from second user addressable data locations disposed along the track after the first partial servo wedge, and reading a second full servo wedge disposed along a first track after the second user addressable data locations, the second full servo wedge defining a leading end and a trailing end and having, between leading and trailing ends, a preamble, a servo sync word, a track ID, and a plurality of servo positioning burst fields.

The servo sync mark read in the first full servo wedge reading step may be shorter in length than the servo sync word read in the first partial servo wedge reading step. The servo sync mark in the first partial servo wedge reading step may include a predetermined bit pattern that may be, for example, 8 bits in length. The predetermined bit pattern in the first partial servo wedge reading step may include a portion in which no logical transitions occur.

BRIEF DESCRIPTION OF THE DRAWINGS

FIG. 4 is a representation of the structure of a track on the recording surface of a disk of a magnetic hard disk drive, according to an embodiment of the present invention.

FIG. 5 shows the structure of a partial servo wedge, according to an embodiment of the present invention.

FIG. 6 shows the structure of a partial servo wedge, according to another embodiment of the present invention.

DESCRIPTION OF THE PREFERRED EMBODIMENTS

Figure 1:
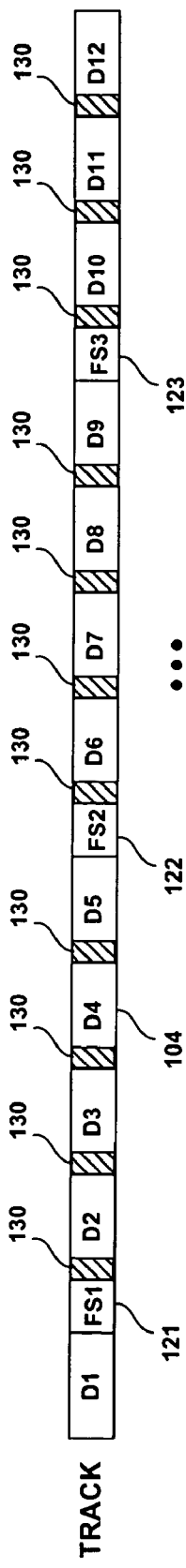
FIG. 1 is a simplified representation of a conventional structure of a track on the recording surface of a disk of a magnetic hard disk drive.

FIG. 4 is a simplified representation of the structure of a track defined on the recording surface of a disk of a magnetic hard disk drive, according to an embodiment of the present invention. Magnetic structures shown in FIG. 4 that are the same as shown in FIG. 1 are labeled with the same reference numbers. Therefore, the track shown in FIG. 4 includes a plurality of data sectors D1–D12. Interspersed within the data sectors are a plurality of full servo wedges of which FS1 121 and FS3 123 are shown.

Considering now the portion of the track of FIG. 4 from reference numeral 121 to 123, a disk according to an embodiment of the present invention includes a first full servo wedge 121, and a second full servo wedge 123. The first full servo wedge 121 and the second full servo wedge 123 may each include a preamble, a servo sync word, a track ID (and optionally a wedge ID) and a plurality of servo positioning burst fields (also called servo burst herein), as described relative to FIG. 2. According to an embodiment of the present invention, the track may also include one or more partial servo wedges disposed between the first full servo wedge 121 and the second full servo wedge 123. The embodiment of FIG. 4 includes one partial servo wedge (PS1) 402. Other embodiments of the present invention may include two (or more) partial servo wedges between the first and second full servo edges 121, 123, subject to maintaining acceptable format efficiency. According to embodiments of the present invention, in contrast to a full servo wedge, the partial servo wedge 402 lacks preamble, servo sync word and track ID (and wedge ID, if present). Moreover, according to an embodiment of the present invention and as shown in FIG. 5, the partial servo wedge 402 may be defined by a short servo sync mark 502 that is followed by a plurality of servo bursts. Such a partial servo wedge disposed between the full servo wedges may include, for example, four servo bursts, shown in FIG. 5 as Servo Burst A 505, Servo Burst B 506, Servo Burst C 507 and Servo Burst D 508. Alternatively, the partial servo burst may only include a short servo sync mark 502 followed by only two servo bursts; namely Servo Burst A 505 and Servo Burst B 506, as shown in FIG. 6.

Figure 2:
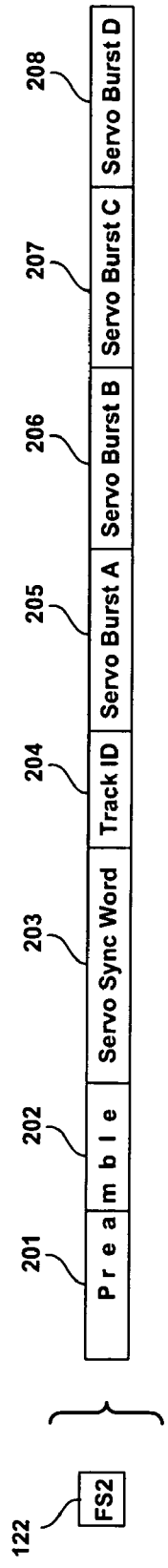
FIG. 2 is a diagram of a conventional structure of a servo sector (also called a servo wedge) recorded on the recording surface of a disk of a magnetic hard disk drive.
Figure 3:
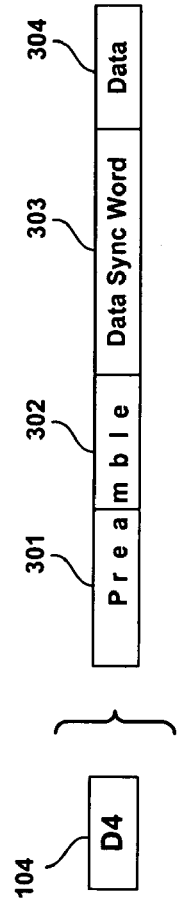
FIG. 3 is a diagram of a conventional structure of a data sector recorded on the recording surface of a disk of a magnetic hard disk drive.

The short servo sync mark 502, according to an embodiment of the present invention, is different from the servo sync word of a full servo sector, such as shown in FIG. 2. Indeed, the short servo sync mark 402 includes a predetermined bit pattern, the detection of which re-establishes timing following the detection of a full servo sector. Following detection of the full servo sync word, the drive's controller opens up a timing window during which it expects to detect a servo sync mark by the detection of a predetermined bit pattern that is characteristic of the servo sync word. After detection of this predetermined bit pattern, the controller can now reliably expect that the next magnetic structures encountered by the read head will be the A, B, C and D servo bursts 505, 506, 507 and 508, or the servo bursts 505 and 506 in the case wherein only two servo bursts are used, as shown in FIG. 6. For example, the predetermined bit pattern of the short servo sync mark 502 may be encoded at the servo writer in a so called Manchester code, in which each logical 1 may be encoded and written by the servo writer as 1100 and in which each logical 0 may be encoded and written by the servo writer as 0011. For example, if the predetermined bit pattern of the short servo sync mark is defined to be 11110000, the servo writer would encode and write the following bit pattern on the disk: 1100 1100 1100 1100 0011 0011 0011 0011. Alternatively, if the predetermined bit pattern of the short servo sync mark is defined as 11110111, the servo writer would encode and write the following bit pattern on the disk: 1100 1100 1100 1100 0011 1100 1100 1100. According to an embodiment of the present invention, when the timing window for the short servo sync mark is open and the four zeroes characteristic of the transition between the "1100"s and "0011"s are read, the read back signal of the servo writer write current exhibits a period in which the frequency thereof changes. This change is the frequency occurs when the four zeros are read by the read back signal, thereby establishing a timing mark in which the precise location of the A, B, C and D servo bursts is known. That is, when the frequency of the read back signal changes (which is characteristic of reading the servo writer write signal during the four-bit long period in which no transitions occur) when the timing window is open, the controller knows precisely the number of cycles to follow before the first servo burst 505 should be detected, as the short servo sync mark is a predetermined bit pattern of known and predetermined length. It is to be noted that the short servo sync mark need not be written as the exemplary bit patterns set out above, and that other bit patterns may be used. For example, the predetermined bit pattern may include a series of logical 1's of a predetermined length, the detection of which when the controller's timing window is asserted establishes a timing mark for the servo bursts to immediately follow.

Figure 7:
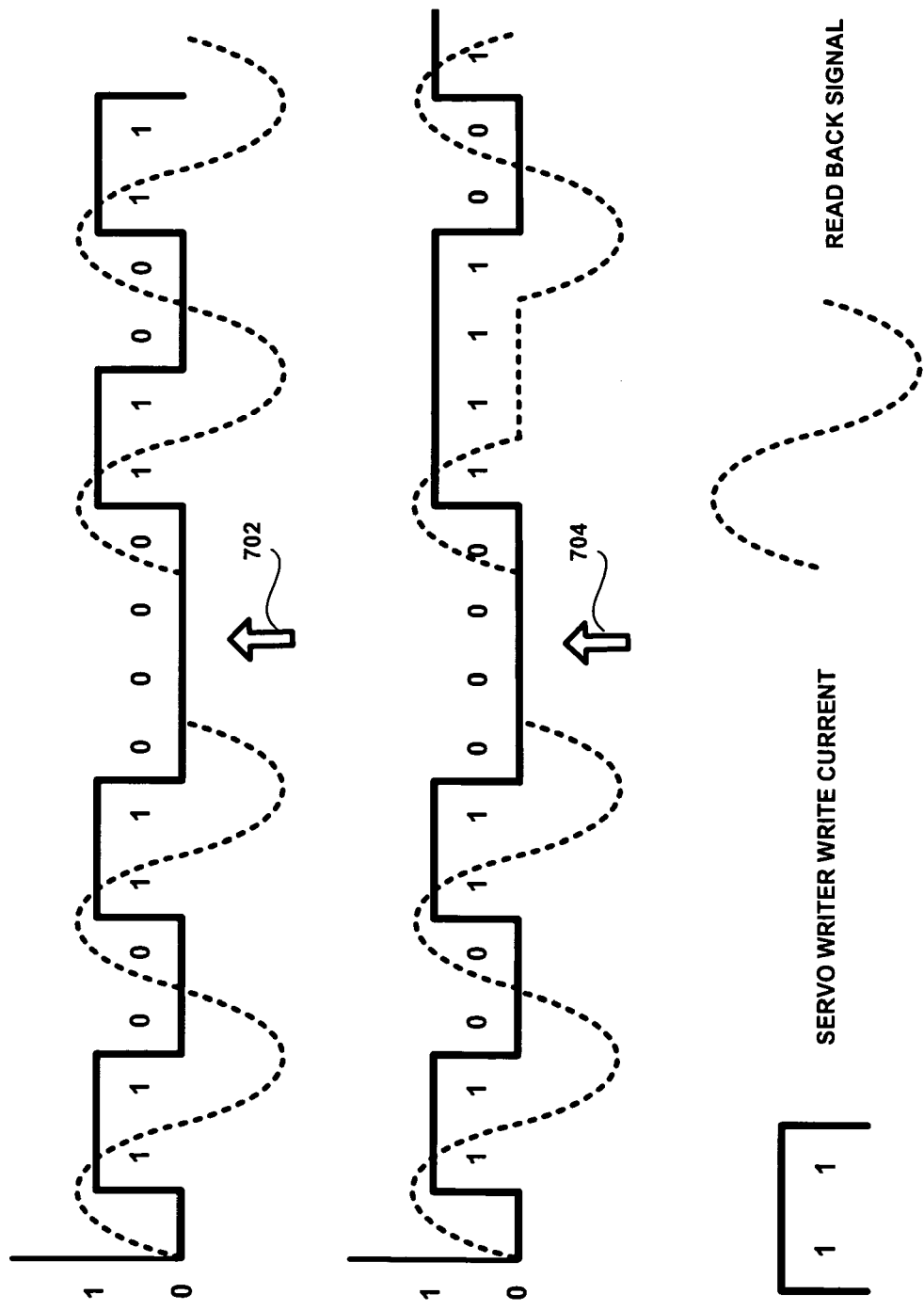
FIG. 7 shows two waveforms traces illustrating the servo writer write current and the read back signal, showing portions of exemplary predetermined bit patterns of a servo sync mark, according to an embodiment of the present invention.

FIG. 7 shows two waveforms traces illustrating the above-described servo writer write current and the read back signal, showing portions of exemplary predetermined bit patterns of a servo sync mark, according to an embodiment of the present invention. Both traces show the servo writer write current signal in solid lines and the read back signal in dashed lines. As shown, the top trace shows a portion of a servo sync mark consisting of bits 1100, which are shown encoded as 1100 1100 0011 0011, according to the above-described Manchester code. The bottom trace shows a portion of a servo sync mark consisting of bits 1101, which are shown encoded as 1100 1100 0011 1100. When this code is read, the frequency of the read back signal changes when reading the portion of the servo sync mark where the four zeros are located, as indicated by arrows 702 and 704. This establishes a timing mark after which the precise location of the A, B, C and D servo bursts to follow is known.

Advantageously, the short servo sync mark before the servo bursts in a partial servo wedge may be of a shorter length than the servo sync word 203 of a conventional servo wedge. Another advantage is that the timing mark established by the detection of the short servo mark 502 allows the width of the guard bands 130 to be reduced, as the effects of the variations in the spindle motor speed are mitigated by the presence of a short servo sync mark 502 before the servo bursts, which reestablishes timing (albeit a timing that is relative to the last detected full servo wedge). Indeed, use of the short servo sync mark 502 decreases the uncertainty in the timing that generally increases from the time that the last full servo wedge was detected. Using a short servo sync mark as described and shown herein may also enable a reduction in the width of the preamble, such as the PLL field described relative to the preamble filed 201. Also, the space between circumferentially adjacent servo burst fields may be decreased, due to the advantages of re-establishing a timing mark within a partial servo wedge according to embodiments of the present invention. From the foregoing, it may be appreciated that the extra overhead of adding a short servo sync mark before the A, B, C and D (or A and B) servo bursts may be more than compensated by the ability to decrease the space on the recording surface of the disk taken up by guard bands, PLL fields and/or by decreasing the space between the servo bursts.

Figure 8:
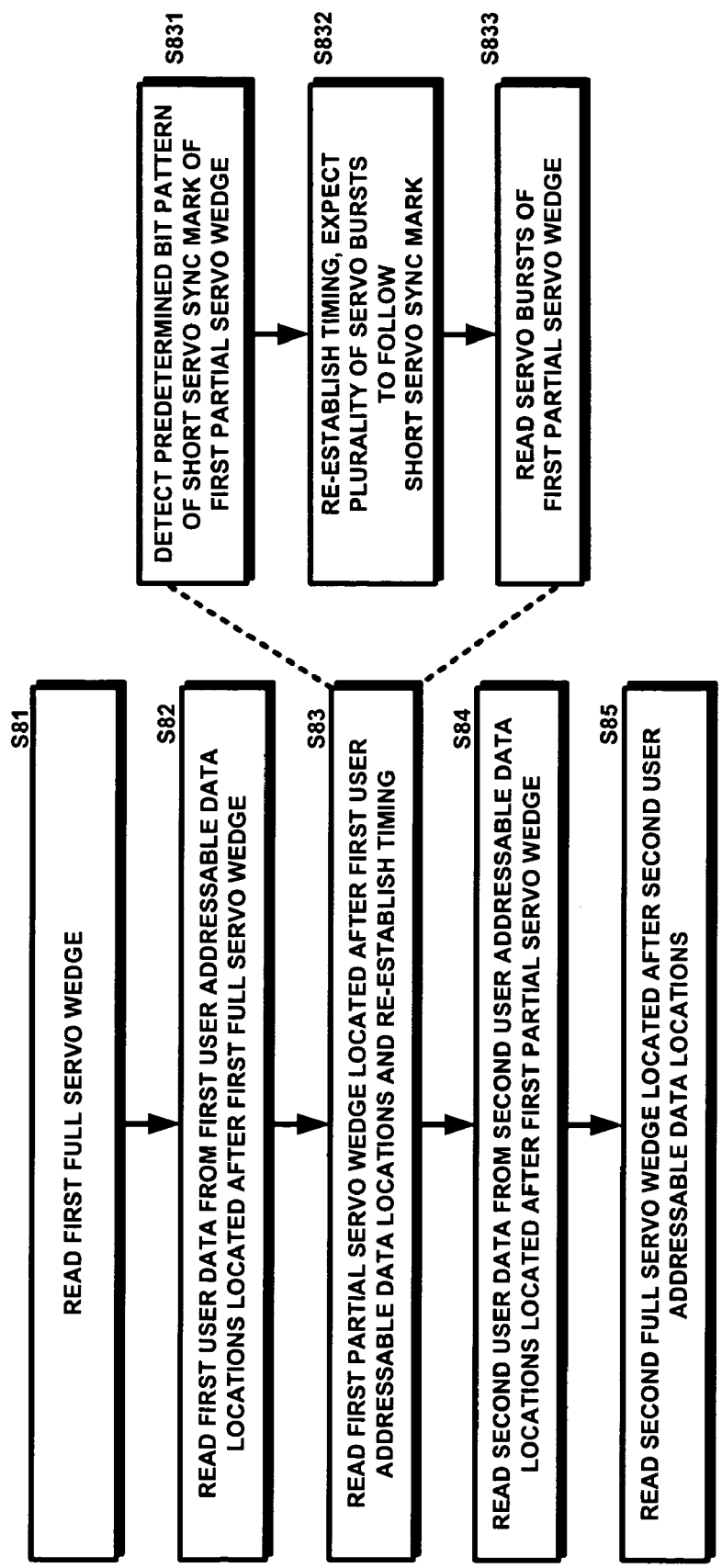
FIG. 8 is a flowchart of a method of reading a disk of a magnetic disk drive according to an embodiment of the present invention.

FIG. 8 is a flowchart illustrating a method of reading a disk, according to an embodiment of the present invention. As shown at S81, the disk drive's read head reads a first full servo wedge. That is, the head reads a servo wedge as shown and described relative to FIG. 2 (which may optionally include a wedge ID field). Thereafter, as indicated at S82, as the disk spins under the head, the head (more precisely, the read transducer of the head) next reads first user data from first user addressable data locations, which user addressable data locations are located after the first full servo wedge. As shown at S83, the drive's read head next reads a first partial servo wedge, such as shown and described relative to FIG. 5 or 6. The first partial servo wedge is located after the previously read user addressable data locations, but before the next full servo wedge. Detection of the predetermined bit pattern of the short servo sync mark 502 re-establishes timing and enables the controller to accurately predict when the next servo burst fields will be read by the head as the disk rotates. As shown at S84, the second user data is read by the head from the second user addressable data locations that are located after the first partial servo wedge. Thereafter, the disk controller may then re-establish absolute timing by reading the second full servo wedge that is located after the second user addressable data locations, as shown at step S85.

Step S73 may be further decomposed into steps S831, S832 and S833, as shown. Step S831 calls for the detection of the predetermined bit pattern of the short servo mark of the first partial servo wedge. When this predetermined bit pattern is detected (using a matched filter, for example) when the timing window for the detection thereof is opened, the controller may re-establish timing as shown at S832, and knows exactly when the servo burst fields 505–506 or 505–508 will be read by the drive's read head, as the nominal rotational speed of the spindle motor is known, and as the servo burst fields follow the servo bursts and as the bit length of the short servo mark is known. This detection is followed by the drive's head reading the servo burst fields, as shown at S833. The second user data may then be read from the second user addressable data locations, as called for by step S84.

Figure 9:
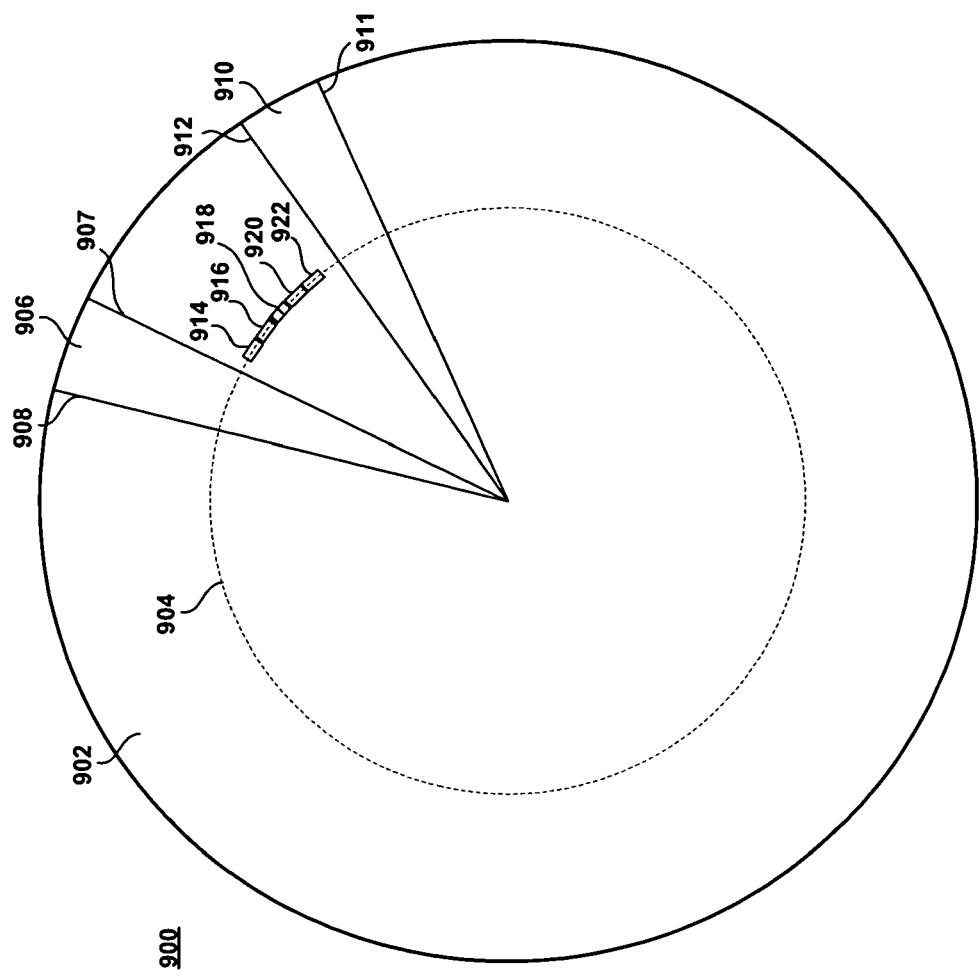
FIG. 9 is a diagram showing full and partial servo sectors and user addressable locations between the full and partial servo sectors, to illustrate further aspects of the present invention.
Figure 10:
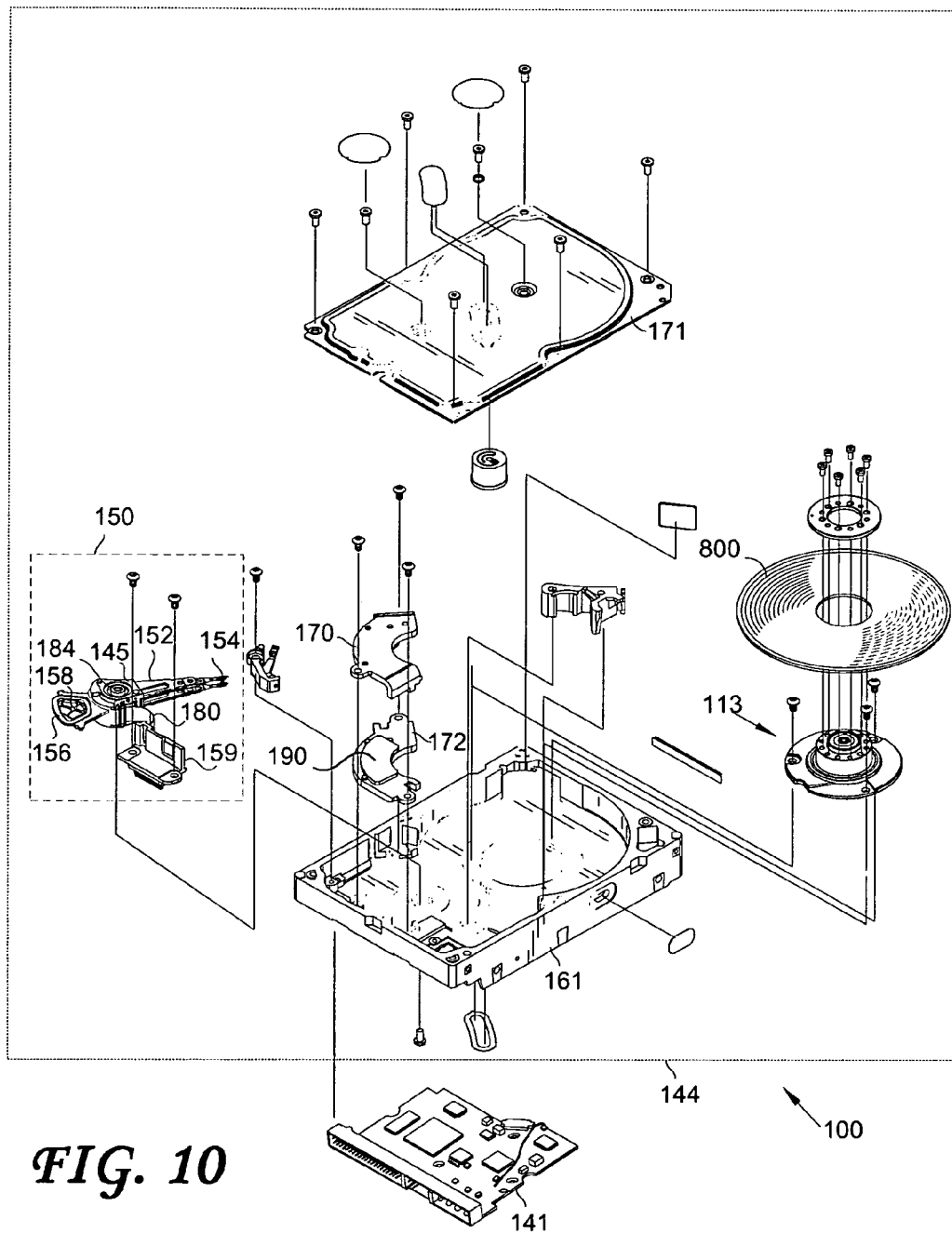
FIG. 10 shows an exploded view of a disk drive, according to an embodiment of the present invention.

FIG. 9 diagram of a magnetic disk showing full and partial servo sectors and addressable locations between the servo sectors of a track on the recording surface of a disk 900, to illustrate further aspects of the present inventions. FIG. 9 shows a recording surface 902 of the disk 900 and one exemplary track 904 thereof, although it is understood that a disk will include many such tracks. Also shown is a first full servo wedge 906 having a leading end 908 and a trailing end 907 and a second full servo wedge 910 having a leading end 912 and a trailing end 911. Each of the first full and second full servo wedges 906, 910 have, between the leading and trailing ends, a preamble, a servo sync word, a track ID and a plurality of servo positioning burst fields, as shown in and described relative to FIG. 2. Servo wedge IDs may also be present. The recording surface 902 of the disk 900 further includes user addressable data locations 914, 916, 920 and 922 and a partial servo wedge 918 disposed between the trailing end 907 of the first full servo wedge 906 and the leading end 912 of the second full servo wedge 910. According to an embodiment of the present invention, the partial servo wedge 918 is devoid of (i.e., does not have a) preamble, servo sync word or track ID (and does not have a wedge ID, if present in the full servo wedges) such as would normally be present in a full servo wedge as shown in FIG. 2. According to another embodiment of the present invention, the partial servo wedge may include a preamble, albeit a preamble of comparatively reduced length, as compared to the preamble of a full servo wedge. The partial servo wedge, according to embodiments of the present invention, has the structure illustrated and described relative to FIG. 5 or 6. It is to be understood that the representation of FIG. 9 is but a conceptual representation of the recording surface of a disk according to an embodiment of the present invention, and is not meant to reflect or show all of the magnetic structures present on a physical magnetic disk and/or the relative dimensions thereof.

According to the present invention, the read head or transducer of the drive may perform an operation (such as track following, for example) in which the read transducer is maintained adjacent the track 904 and produces a read signal that has multiple servo phases and multiple data phases. During a first servo phase, the read signal produced by the read transducer represents data read from the first servo wedge 906 and during a second servo phase, the read signal represents data read from the second servo wedge 910.

FIG. 9 shows the principal components of a magnetic disk drive 100 according to an embodiment of the present invention. With reference to FIG. 9, the disk drive 100 comprises a head disk assembly (HDA) 144 and a printed circuit board assembly (PCBA) 141. The HDA 144 includes a base 161 and a cover 171 attached to the base 161 that collectively house one or more disks 900 (only one disk 900 is shown in FIG. 9) configured as shown in FIGS. 4, 5, 6 or 8 (for example), a spindle motor 113 attached to the base 161 for rotating the disk 900, a head stack assembly (HSA) 150, and a pivot bearing cartridge 184 that rotatably supports the HSA 150 on the base 161. The spindle motor 113 rotates the disk 900 at a constant angular velocity, subject to the above-described variations. The HSA 150 comprises a swing-type or rotary actuator assembly 152, at least one head gimbal assembly that includes the suspension assembly 154, a flex circuit cable assembly 180 and a flex bracket 159. The rotary actuator assembly 152 includes a body portion 145, at least one actuator arm cantilevered from the body portion 145, and a coil assembly including a coil 156 cantilevered from the body portion 145 in an opposite direction from the actuator arm(s). A bobbin 158 may be attached to the inner periphery of the coil assembly to stiffen the coil assembly. The actuator arm(s) support respective suspension assembly (ies) that, in turn, support the head that includes the read/write transducer(s) (116, 114 shown in FIG. 1) for reading and writing to the disk 900. The HSA 150 is pivotally secured to the base 161 via the pivot-bearing cartridge 184 so that the read/write transducer(s) at the distal end of the suspension assembly(ies) may be moved over the recording surface(s) of the disk(s) 900. The pivot-bearing cartridge 184 enables the HSA 150 to pivot about its pivot axis. The "rotary" or "swing-type" actuator assembly rotates on the pivot bearing cartridge 184 between limited positions, and the coil assembly that extends from one side of the body portion 145 interacts with one or more permanent magnets 190 mounted to back irons 170, 172 to form a voice coil motor (VCM). When a driving voltage is applied to the VCM, torque is developed that causes the HSA 150 to pivot about the actuator pivot axis and causes the read/write transducer(s) to sweep radially over the disk 900.

What is claimed is:

1. A disk drive, comprising:
a spindle motor;
a disk mounted for rotation on the spindle motor, the disk including a recording surface having a track that includes a first full servo wedge and a second full servo wedge, each of the first full and second full servo wedges defining a leading end and a trailing end and having, between leading and trailing ends, a preamble, a servo sync word, a track ID, and a plurality of servo positioning burst fields, the recording surface further including user addressable data locations and a first partial servo wedge disposed between the trailing end of the first full servo wedge and the leading end of the second full servo wedge, the first partial servo wedge being devoid of preamble, track ID and wedge ID and including a short servo sync mark that is different from the servo sync word, the servo sync mark defining a predetermined bit pattern that is immediately followed by a plurality of servo bursts, and a head for reading from and writing to the disk.

2. The disk drive of claim 1, further including at least one second partial servo wedge between the first partial servo wedge and the second full servo wedge.

3. The disk drive of claim 1, wherein the servo sync mark is shorter in length than the servo sync word.

4. The disk drive of claim 1, wherein the servo sync mark includes a predetermined bit pattern.

5. The disk drive of claim 4, wherein the predetermined bit pattern is 8 bits in length.

6. The disk drive of claim 4, wherein the predetermined bit pattern includes a portion in which no logical transitions occur.

7. A disk for a magnetic disk drive, the disk including a recording surface having a track that includes a first full servo wedge and a second full servo wedge, each of the first full and second full servo wedges defining a leading end and a trailing end and having, between leading and trailing ends, a preamble, a servo sync word, a track ID, and a plurality of servo positioning burst fields, the recording surface further including user addressable data locations and a first partial servo wedge disposed between the trailing end of the first full servo wedge and the leading end of the second full servo wedge, the first partial servo wedge being devoid of preamble, track ID and wedge ID and including a short servo sync mark that is different from the servo sync word, the servo sync mark defining a predetermined bit pattern that is immediately followed by a plurality of servo bursts.

8. The disk of claim 7, further including at least one second partial servo wedge between the first partial servo wedge and the second full servo wedge.

9. The disk of claim 7, wherein the servo sync mark is shorter in length than the servo sync word.

10. The disk of claim 7, wherein the servo sync mark includes a predetermined bit pattern.

11. The disk of claim 10, wherein the predetermined bit pattern is 8 bits in length.

12. The disk of claim 10, wherein the predetermined bit pattern includes a portion in which no logical transitions occur.

13. A method of reading a magnetic disk of a disk drive, the method comprising the sequential steps of:

reading a first full servo wedge disposed along a first track, the first full servo wedge defining a leading end and a trailing end and having, between leading and trailing ends, a preamble, a servo sync word, a track ID, and a plurality of servo positioning burst fields;

reading first user data from first user addressable data locations disposed along the track after the first full servo wedge;

reading a first partial servo wedge disposed along the first track after the first user addressable locations, the first partial servo wedge being devoid of preamble, track ID and wedge ID and including a short servo sync mark that is different from the servo sync word, the servo sync mark defining a predetermined bit pattern that is immediately followed by a plurality of servo bursts;

reading second user data from second user addressable data locations disposed along the track after the first partial servo wedge, and reading a second full servo wedge disposed along a first track after the second user addressable data locations, the second full servo wedge defining a leading end and a trailing end and having, between leading and trailing ends, a preamble, a servo sync word, a track ID, and a plurality of servo positioning burst fields.

14. The method of claim 13, wherein the servo sync mark read in the first full servo wedge reading step is shorter in length than the servo sync word read in the first partial servo wedge reading step.

15. The method of claim 13, wherein the servo sync mark in the first partial servo wedge reading step includes a predetermined bit pattern.

16. The disk of claim 15, wherein the predetermined bit pattern in the first partial servo wedge reading step is 8 bits in length.

17. The disk of claim 10, wherein the predetermined bit pattern in the first partial servo wedge reading step includes a portion in which no logical transitions occur.

* * * * *